(12) United States Patent
Gödecke et al.

(10) Patent No.: US 7,134,378 B2
(45) Date of Patent: Nov. 14, 2006

(54) CONTINUOUSLY VARIABLE TRANSMISSION

(75) Inventors: Tobias Gödecke, Kernen (DE); Steffen Henzler, Böbingen (DE); Daniel Seibold, Ostfildern (DE)

(73) Assignee: DaimlerChrysler AG, Stuttgart (DE)

( * ) Notice: Subject to any disclaimer, the term of this patent is extended or adjusted under 35 U.S.C. 154(b) by 59 days.

(21) Appl. No.: 11/037,384

(22) Filed: Jan. 18, 2005

(65) Prior Publication Data

US 2005/0159269 A1     Jul. 21, 2005

Related U.S. Application Data

(63) Continuation-in-part of application No. PCT/EP2003/006696, filed on Jun. 25, 2003.

(30) Foreign Application Priority Data

Jul. 19, 2000    (DE) .............................. 102 33 089

(51) Int. Cl.
  *F15B 11/08*    (2006.01)
  *F16H 61/662*   (2006.01)
(52) U.S. Cl. .................... 91/418; 91/466; 476/10
(58) Field of Classification Search ................ 91/418, 91/433, 454, 462, 466; 476/10
  See application file for complete search history.

(56) References Cited

U.S. PATENT DOCUMENTS 3,684,065 A * 8/1972 Scheiter ...................... 475/115
4,662,248 A * 5/1987 Greenwood ..................... 476/3
4,744,032 A    5/1988 Miyaura
5,540,048 A * 7/1996 Larkin et al. .................. 60/327
6,132,333 A   10/2000 Inoue
6,162,144 A * 12/2000 Haka ........................... 476/10
6,626,793 B1 * 9/2003 Greenwood ................... 476/10
2002/0086764 A1 7/2002 Ooyama

FOREIGN PATENT DOCUMENTS

| DE | 197 33 660 A1 | 2/1999 |
| DE | 197 57 017 A1 | 7/1999 |
| DE | 102 06 200    | 8/2003 |
| EP | 0 937 913     | 1/2004 |
| JP | 07151218 A    | 6/1995 |
| JP | 08233085 A    | 9/1996 |
| JP | 09210164      | 8/1997 |
| JP | 09210164 A    | 8/1997 |

* cited by examiner

*Primary Examiner*—Igor Kershteyn
(74) *Attorney, Agent, or Firm*—Klaus J. Bach

(57) ABSTRACT

In a continuously variable transmission with a toroidal variable speed drive, in which a roller is supported pivotably between two toroidal disks for transmitting motion between the two toroidal disks at transmission ratios which depend on the pivot position of the roller according to pressure forces acting on a hydraulic actuating piston, for the purpose of varying the transmission ratio, two regulating slide valves are provided, each including a regulating slide with control edges to act upon the hydraulic actuating piston via a hydraulic medium under the control of the regulating slide valves each controlling the pressure in one of the chambers arranged at opposite ends of the actuating piston.

17 Claims, 13 Drawing Sheets

CONTINUOUSLY VARIABLE TRANSMISSION

This is a continuation-in-part application of international application PCT/EP2003/006696 filed Jun. 25, 2003 and claiming the priority of German application 102 33 089.1 filed Jul. 19, 2002.

The invention relates to a continuously variable transmission including a toroidal traction roller drive.

DE 197 57 017 C2 discloses a transmission in which a drive torque is transmitted between a driving toroidal disk and a driven toroidal disk via a roller which is in frictional contact with the toroidal disks. With the changing of the pivot position of the roller, the contact radii of the roller on the toroidal disks are continuously variable, so that the transmission ratio can be varied continuously between the driving toroidal disk and the driven toroidal disk. The roller is supported, transversely to the axis of rotation of the toroidal disks and in the direction of the frictional force acting between the roller and the toroidal disks, with respect to at least one piston, by means of which a regulating force is applied. The position of the roller and consequently the transmission ratio can be varied via the regulating force. For this purpose, the piston can be acted upon via two pressure spaces, the regulating force being variable according to action upon the pressure spaces with a hydraulic medium. Action upon the pressure spaces takes place via a regulating slide valve. The regulating slide valve is supplied with a working fluid pressure and with a control fluid pressure. According to the control fluid pressure, a regulating fluid pressure, which, in particular, is proportional to the control pressure, is generated by means of the regulating slide valve as an output pressure of the latter. The regulating fluid pressure is supplied to at least one pressure space in order to set the regulating force.

It is the object of the present invention to provide a continuously variable transmission which, along with simple or cost-effective manufacture, ensures an accurate control of the pivot position of the roller.

SUMMARY OF THE INVENTION

In a continuously variable transmission with a toroidal variable speed drive, in which a roller is supported pivotably between two toroidal disks for transmitting motion between the two toroidal disks at transmission ratios which depend on the pivot position of the roller according to pressure forces acting on a hydraulic actuating piston, for the purpose of varying the transmission ratio, two regulating slide valves are provided each including a regulating slide with control edges to act upon the hydraulic actuating piston via a hydraulic medium under the control of the regulating slide valves, each controlling the pressure in one of the chambers arranged at opposite ends of the actuating piston.

The invention is based on the recognition that controlling the pressure in the pressure spaces via a single regulating slide has disadvantages. The regulating slide valves used according to the prior art have in this case a regulating slide with two pressure chambers. The known regulating slides have four control edges. For an exact design of the regulating slide valves, these four control edges form multiple fits which have to be manufactured with high accuracy, on the one hand, with respect to the adjacent control edges and, on the other hand, with respect to the control passages of the regulating slide. Furthermore, a setting of the opening conditions for the flow cross sections between individual pressure chambers of the solenoid regulating valve is predetermined by the relative position of the control edges with respect to one another and cannot (subsequently) be adjusted. An individual compensation of tolerance-induced fluctuations of the regulating pressures is likewise not possible.

According to the invention, for each pressure space of the transmission a regulating slide valve is provided. In the simplest instance, the regulating slide valve has only one outlet for the regulating pressure and two inlets for a working pressure and a control pressure.

A regulating slide valve of this type may have a regulating slide which has only two control edges. This results in a reduced outlay in manufacturing terms. The manufacturing costs can be lowered as a result of the reduced tolerance requirements. At the same time, an increased reliability of the regulating valve and consequently of the adjustable regulating pressure is obtained. On the other hand, the two regulating slide valves constitute separate systems which can be set independently.

Preferably, for controlling the torque of the transmission, pressure sensors for detecting the pressures in the pressure spaces are omitted. In a refinement according to the invention, a good controllability of the pressures in the pressure spaces and consequently an accurate orientation of the roller according to the desired transmission ratio are obtained. Furthermore, in the design according to the invention, a markedly reduced system pressure and therefore a lower energy requirement are achieved, particularly during the idling of the vehicle and under low load, in relation to comparable systems according to the prior art.

Preferably, depending on the load situation, that is to say for both directions of the (drive) torque acting on the roller, the regulating pressure of one of the two pressure chambers is kept constant at a low pressure, in particular at zero pressure. The regulating force is derived from the difference in the pressure forces on the piston which are effective in the pressure spaces. Owing to the configuration according to the invention, care is taken to ensure that components which act in opposite directions in the pressure chambers and which would cancel each other out are avoided. The efficiency of the variable transmission according to the invention can thereby be increased.

A development of the variable transmission is characterized in that the regulating slides are acted upon by a common control pressure. This, on the one hand, has the advantage that a common device for providing the control pressure can be used, with the result that the number of components required is reduced. Moreover, the influence of fluctuations of the control pressure can be reduced, since deviations of the control pressure from a desired pressure lead to reactions on both sides of the piston.

According to a particular refinement of the variable transmission, one regulating slide valve is designed so as to be inverted with respect to the other regulating slide valve. This means that, for an increase in the control pressure in one pressure chamber, the regulating pressure is increased, whereas the regulating pressure in the other pressure chamber is reduced with an increase in the control pressure. A variation in the control pressure thus results in a double-acting change in the regulating force, particularly effective control thereby being possible.

According to a further proposal of the invention, compression springs supporting the regulating slides, the active end faces of the regulating slides and the position of the control edges are designed in such a way that, in a defined working range, the regulating slide valves in each case generate a regulating pressure rising linearly from zero.

When the working ranges partially overlap one another, three operating regions are obtained: the two part working ranges correspond to a first and a third operating region, in each of which only one pressure space is acted upon by a regulating pressure of the regulating slide valve located in the working range. In these operating regions, control with high efficiency becomes possible. In the overlap region (second operating region), both pressure spaces are acted upon by a regulating pressure. The regulating force is thus derived from a superposition of the components of the regulating force which are generated in the pressure spaces. The dependence of the regulating force or the control pressure/control pressures is continuous, with an abrupt change in the gradient, in the transitional region from the first operating region to the second operating region and from the second operating region to the third operating region (and vice versa). Second operating regions with a higher gradient result in a greater pressure change bringing about a low torque change. If the second operating region extends in the region of the changeover of the driving ranges and the reversal in direction of the torque, an especially sensitive control can take place via the change in the gradient of the pressure/regulating force characteristic.

According to a modification of the invention, the working ranges of the regulating slide valves are directly contiguous to one another without overlapping one another. This does away with the second operating region, so that high efficiency is afforded for all the operating regions.

Furthermore, the invention makes it possible for at least one regulating slide of a regulating slide valve to be displaceable with respect to a pressure space by means of a supporting pressure. This may take place alternatively or additionally to the support of the regulating slide via a compression spring. By the action of pressure, an increase in the variability of the hydraulic system can be achieved via the (variable) setting of the pressure.

According to a development of the invention, a control pressure is supplied to a first regulating slide valve and the regulating pressure of the first regulating slide valve is supplied as control pressure to the second regulating slide valve. Consequently, any deviations of the regulating pressure from a desired pressure of the first regulating slide valve, for example as a result of manufacturing errors in the first regulating slide valve or as a result of faults in the control pressure or working pressure, are supplied to the second regulating slide valve. However, the abovementioned deviations consequently act on both pressure spaces. An automatic (at least partial) mutual leveling out of regulating deviations thereby becomes possible.

Preferably, the pressure for support in the abovementioned pressure chamber is lowered to a low level in the case of low loads and during idling. The level of the required working and control pressures can thereby also be lowered, thus resulting in a further improved efficiency.

A further solution for achieving the object on which the invention is based is characterized in that a regulating pressure of a first regulating slide valve is supplied to one pressure space and a regulating pressure of a second regulating slide valve is supplied to the other pressure space, the second regulating slide valve being acted upon by a control pressure and by the regulating pressure of the first regulating slide valve. By virtue of this, any deviations of the regulating pressure from a desired pressure of the first regulating slide valve, for example as a result of manufacturing tolerances in the first regulating slide valve or as a result of faults in the control or working pressure, are supplied to the second regulating slide valve. In this case, both the recirculated regulating pressure of the first regulating slide valve and the control pressure which is independent of, or corresponds to, the control pressure of the first regulating slide valve influence the equilibrium of forces on the regulating slide of the second regulating slide valve.

Advantageous embodiments will become apparent from the description and the drawing. Preferred exemplary embodiments of the transmission according to the invention will be described in more detail below with reference to the drawings.

DESCRIPTION OF PREFERRED EMBODIMENTS

Figure 1:
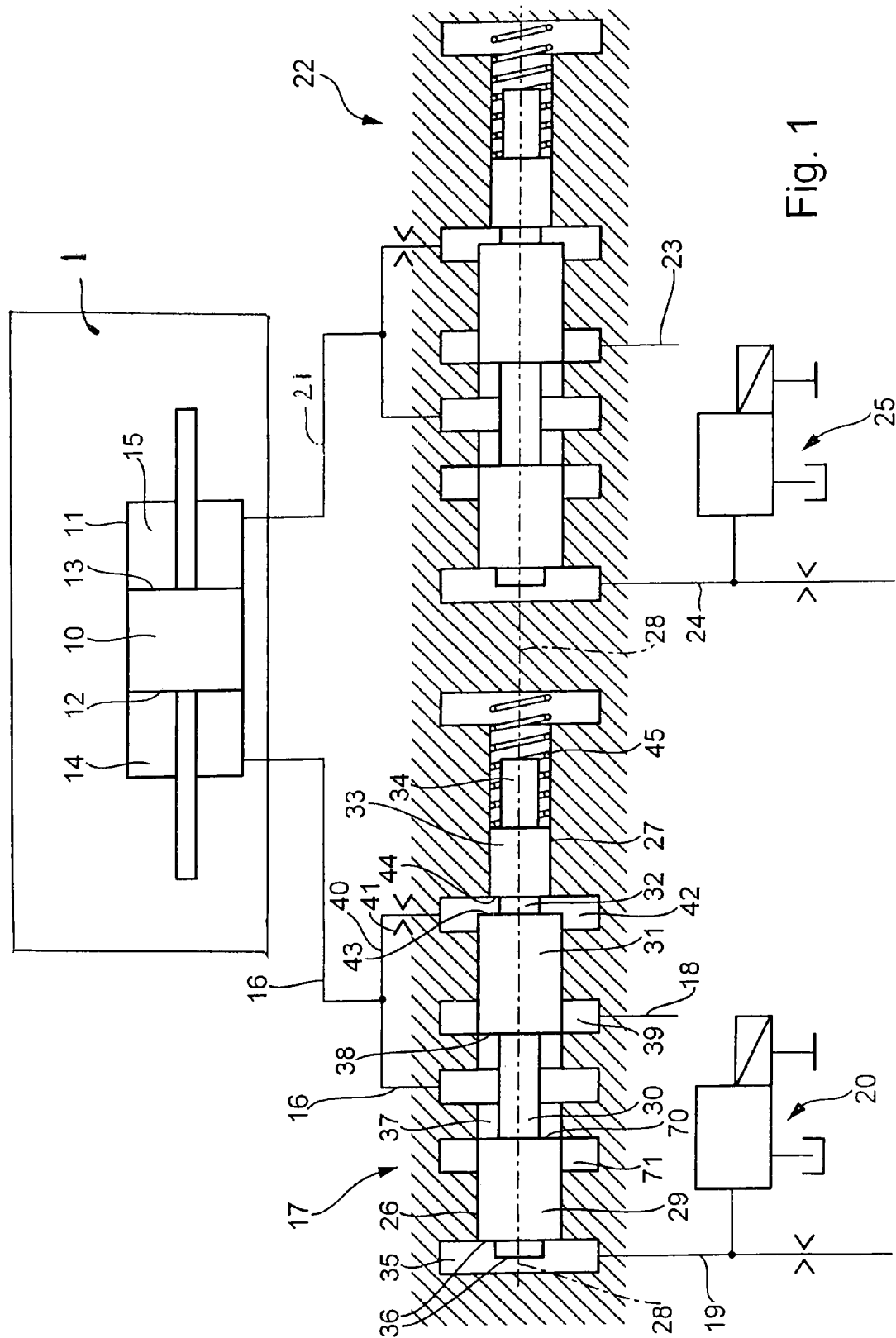
FIG. 1 shows a hydraulic fluid supply device of a transmission according to the invention in a first exemplary embodiment.

The transmission with which the invention is concerned is a continuously variable transmission, preferably with a plurality of driving ranges for forward drive as they are well known in the art. It is, in particular, a power-split transmission which has at least two parallel power paths, at least one power path having a constant transmission ratio, and a further power path having a variable transmission ratio adjustable by means of a variable-speed drive formed by at least one driving toroidal disk, at least one driven toroidal disk and at least one roller. The driving ranges are advantageously designed in such a way that a driving range change is possible, without a sudden change in the transmission ratio and without a change in the ratio of the variable-speed gear, when the shift elements are actuated at a synchronous rotational speed. As a result, during the driving range change, the power flow on variable power path and consequently via the variable-speed gear must be reversed. This results in a reversal in the direction of the transmitted torque at the variable-speed gear.

The at least one roller is mounted pivotably about a pivot axis, the transmission ratio between the toroidal disks being variable according to the pivoting of the roller. In the direction of the pivot axis, the roller is supported, if appropriate with mechanical carrying and guiding elements being interposed, via one piston acting in both directions, or two pistons acting in opposite directions. The supporting forces are composed of a partial force which is constant for a quasistationary operating state and which contains, for example, a superposition of the frictional forces acting on the roller, and also a variable partial force which results for example from changes in the operating conditions and/or any inclined rolling direction at the rolling contact between roller and toroidal disks as a result of a translational displacement of the rollers in the direction of the pivot axis. In addition, it is also possible to convert a rotational movement of the rollers about the pivot axis into a translational movement of the piston via suitable gear elements.

With regard to the gear elements interposed between roller and piston in order to implement the force flux and to couple the piston to the roller, reference is made, for example, to the corresponding devices in the publications EP 0 937 913, U.S. Pat. No. 6,132,333, JP 09 20 3 450, JP 09 210 164, JP 08 233 085, JP 07 151 218, DE 197 57 017 C2 and the unpublished application DE 102 06 200.5. Further relevant devices may be gathered from the following literature references:

H Kumura, Nissan Motor Co.: Development of a Dual-Cavity Half—Toroidal CVT. Int. Congress on Continuously Variable Power Transmission CVT'99, Eindhoven, Sep. 16–17, 1999, H. Sakai, Nissan Motor Co.: Speed control device of toroidal type continuously variable transmission.

K. Abo, Nissan Motor Co.: Development of a metal belt-drive CVT incorporating a torque convereter for use with 2-liter class engines. Transmission and Driveline Systems Symposium 1998, SAE Paper 980823, 1998.

A further embodiment of an adjustment of the roller via a piston may be gathered form a present-day series transmission ("Extroid" of the vehicle manufacturer Nissan).

The abovementioned embodiments of a tie-up of a piston to the roller in order to apply a regulating force for regulating the position of the roller and consequently the transmission ratio can easily be integrated into the subject of the present application. The abovementioned applications in terms of the gear elements interposed between piston and roller.

According to the exemplary embodiment illustrated in FIG. 1, the piston is designed as a piston 10 acting in both directions for controlling the transmission ratio of an associated infinitely variable toroidal transmission. The piston 10 is received in a cylinder 11 and can be acted upon on opposite end faces 12, 13 in each case by a hydraulic medium via pressure spaced 14, 15. The end faces 12, 13 have identical or different diameters. The regulating force which is generated at the piston 10 and which acts on the roller, if appropriate with a suitable transmission ratio being interposed, is derived from the difference between the product of the pressure in the pressure space 14 and the end face 12 and the product of the pressure in the pressure space 15 and the end face 13.

According to the exemplary embodiment illustrated in FIG. 1, the pressure space 14 is acted upon by a regulating pressure via a first regulating pressure line 16. The regulating pressure is the output of a regulating slide valve 17, which is acted upon as input quantities by a constant or variable working pressure via a working pressure line 18 and by a control pressure via a control pressure line 19. The control pressure is the output of a solenoid regulating valve 20 which generated according to an electrical signal a control pressure which, in particular, is proportional to the electrical signal.

The solenoid regulating valve 20 is constructed according to the solenoid regulating valves known per se which generate a control pressure dependent on an input quantity, such as an electrical signal. As regards exemplary embodiments of a solenoid regulating valve 20 of this type, reference is made to the not previously published patent applications DE 102 07 991.9 or DE 102 14 292 and DE 101 18 104.3 or the publication DE 197 33 660 A1.

The pressure space 15 is acted upon by a regulating pressure via a regulating pressure line 21. The regulating pressure line 21 is acted upon with hydraulic medium via a regulating slide valve 22. The regulating slide valve 22 is supplied with a working pressure via a working pressure line 23 and with a control pressure via a control pressure line 24. The control pressure in the control pressure line 24 is an output quantity of a solenoid regulating valve 25 which, at least in terms of function, is designed according to the solenoid regulating valve 20.

The regulating slide valve 27 has a regulating slide 26 which is displaceable axially along an axis 28-28 in a housing 27. The regulating slide 26 has a first part region 29, a second part region 20, a third part region 31, a fourth part region 32, a fifth part region 33 and a sixth part region 34.

The part regions 29–34 are arranged coaxially to the axis 28-28 one after the other in the abovementioned order and have an essentially cylindrical cross-section. The part regions 29, 31, and 33 are guided so as to be sealed off radially with respect to the housing.

The regulating slide valve 17 has a control pressure space 35 to which a control pressure is supplied via the control pressure line 19. In the control pressure space 35, one interface 36 of the first part region 29 is acted upon by the control pressure. The control pressure acts on the regulating slide 26 independently of the position of the latter.

In the second part region 30, the slide 26 has a reduced cross-section between the part regions 29, 31, and, together with the housing of the regulating slide valve 17, forms, radially outward from the part region 30, a regulating pressure chamber 37 which is constantly connected hydraulically to the regulating pressure in the regulating pressure chamber 37 acts on the mutually confronting end faces of the part region 31, 29, so that the forces exerted by the regularing pressure cancel one another, with the cross-sections of the part regions 31, 29 being the same. In the case of a different configuration with different cross-sections, a resultant force remains.

The end face 38 of the part region 31, which confronts the end face of the part region 29 forms a control edge 38. The working pressure line 18 is connected to an annular groove 39. Via a displacement of the control edge 38, an annular flow passage from the annular groove 29 to the regulating pressure space 37 is opened, the size of the flow passage being variable according to the displacement of the slide member 26 along the axis 28—28. In the position illustrated in FIG. 1, the flow passage is just closed. With any movement of the regulating slide 26 to the right, the flow passage is opened.

The regulating pressure of the regulating pressure line 16 is applied via a bypass line 40 to a bypass space 42, possibly via throttle 41 being interposed. In the bypass space 42, the bypass pressure acts on that end face 43 of the third part region which is located opposite the control edge 38 and on that end face 44 of the part region 33 which confronts the end face 43. The cross-sectional area of the end face 43 is larger than that of the end face 44, so that the bypass pressure in the bypass space 42 exerts a resultant force on the regulating slide 26 in the direction of the closed position of the regulating slide valve 17.

The regulating slide 26 is supported with respect to the housing via a compression spring 45 on the end face of the part region 33 which is located opposite the end face 44. The compression spring 45 preferably surrounds the outer surface area of the part region 34. Alternatively or, additionally, one of the above-mentioned pressures or a separately adjustable pressure may act on the outer end faces of the part regions 33, 34.

A further control edge 70 of the part region 29 delimits the regulating pressure space 37. In the position illustrated in FIG. 1, the control edge 70 just closes the flow passage from the regulating pressure space 37 to a pressureless annular duct 71, which is connected, for example, to a tank. In the position illustrated, the assigned flow passage for the control edges 38, 70 are just closed. With a movement of the regulating slide 26 out of the position illustrated to the right, the control edge 38 opens, while, for a movement out of the depicted position to the left, the control edge 70 opens.

The following forces act on the regulating slide 26 in the direction of the axis 28-28:
  pressure force of the control pressure 19 on the end face 36,
  resultant pressure force of the bypass pressure on the end faces 43, 44,
  the force of the spring 45,
  any pressure forces on the outer end faces of the part regions 33, 34.

From the position illustrated in FIG. 1, the regulating slide valve is displaced to the right by an increase in the control pressure prevailing in the control pressure line 19, so that the control edge 38 opens a passage between the duct 39 and the regulating pressure space 37. The regulating pressure in the regulating pressure line 16 thereby rises. Likewise, In the pressure in the bypass space 42 rises as a result of connection to the bypass line 40. On account of the different cross-sectional areas of the end faces 44, 43, with a rising regulating pressure in the regulating pressure line 16 a force in the closing direction of the control edge 38 is generated, so that an equilibrium is established automatically.

In the event of an operationally induced drop in the regulating pressure in the pressure space 14, the resultant of the forces acting on the regulating slide 26 decreases as a result of the pressure drop in the bypass space 42. The regulating slide 26 moves to the right. The result of this is that the flow passage from the working pressure line 18 is to the regulating pressure line 16 is opened (to a greater extent) via the control edge 38. The pressure in the regulating pressure line 16 and consequently in the bypass space 42 rises until the equilibrium of forces is restored.

The regulating slide valve 22 is designed essentially according to the regulating slide valve 17.

Figure 2:
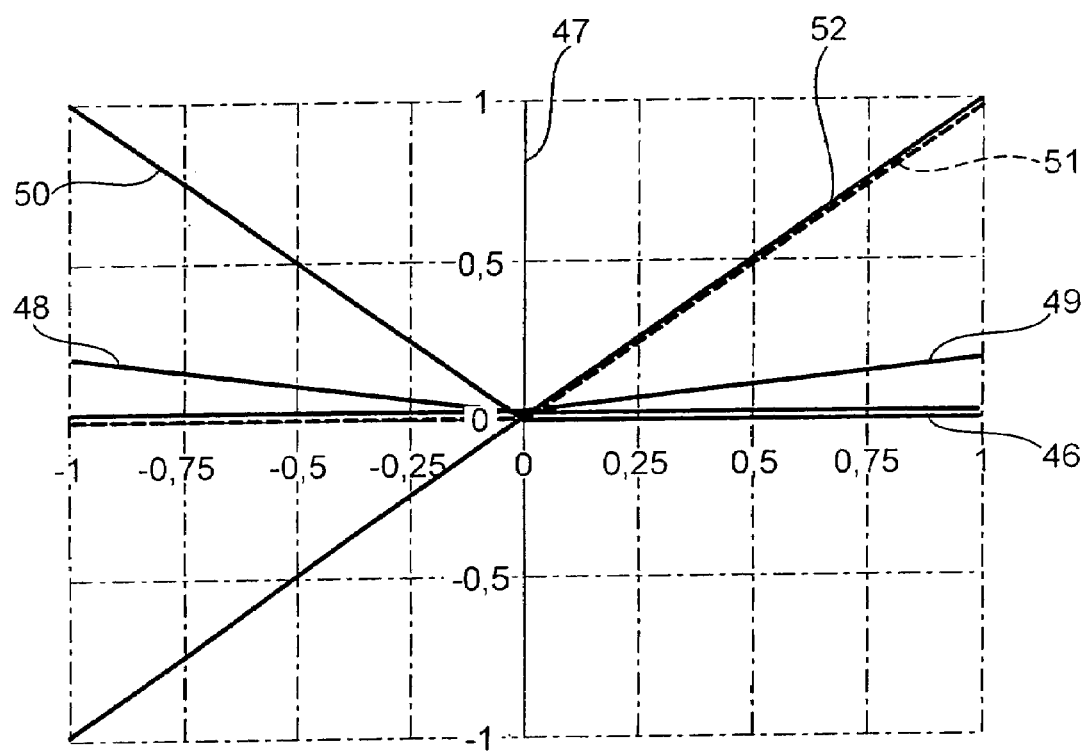
FIG. 2 shows pressure and regulating force dependences according to the first exemplary embodiment.

In FIG. 2, the pressures 47 are plotted as a function of the regulating force 46 of the torque correlated to the latter. The control pressure 49 increases linearly for a movement of the regulating slide 26 of the regulating slide valve 17 to the right out of the position depicted in FIG. 1. As a result of the proportional amplification of the regulating slide, this results in a steeper liner rise in the regulating pressure 51 of the regulating slide valve 17 and consequently in the pressure in the pressure chamber 14. In this working range of the regulating slide valves 17, 22, by suitable action upon the assigned solenoid regulating valve, the control pressure 48 of the regulating slide valve 22 is maintained at zero or is maintained in ranges in which the regulating pressure space of the regulating slide valve 22 is connected hydraulically to the pressureless annular duct. Thus, only the regulating pressure of the regulating slide valve 17, which prevails in the pressure space 14 acts on the piston 10, so that the resultant regulating force 52 rises linearly.

For a movement of the regulating slide 26 to the left out of the position depicted in FIG. 1, the above-mentioned pressured conditions are reversed:

In this operating range, by suitable action upon the assigned solenoid regulating valve, the control pressure 49 of the solenoid regulating valve 17 is maintained at zero or is maintained in ranges in which the regulating pressure space of the regulating slide valve 17 is connected hydraulically to the pressureless annular groove 71. The pressure space 14 is thus pressureless in this operating range. By contrast, the pressure space 15 is acted upon by a regulating pressure 48 of the solenoid regulating valve 22 in a way unequal to zero. The reversal in direction of the action of pressure upon the piston 10 results in a negative regulating force 52. A constantly linear profile of the regulating force 52 is obtained over both operating ranges.

It is evident from FIG. 2, that, in trailing operation and in the lower part load range, only a low pressure level is required. The working pressure is set (automatically) as a function of the load, thus resulting, particularly in the lower part load range, in a low system pressure and therefore a low energy requirement.

Figure 3:
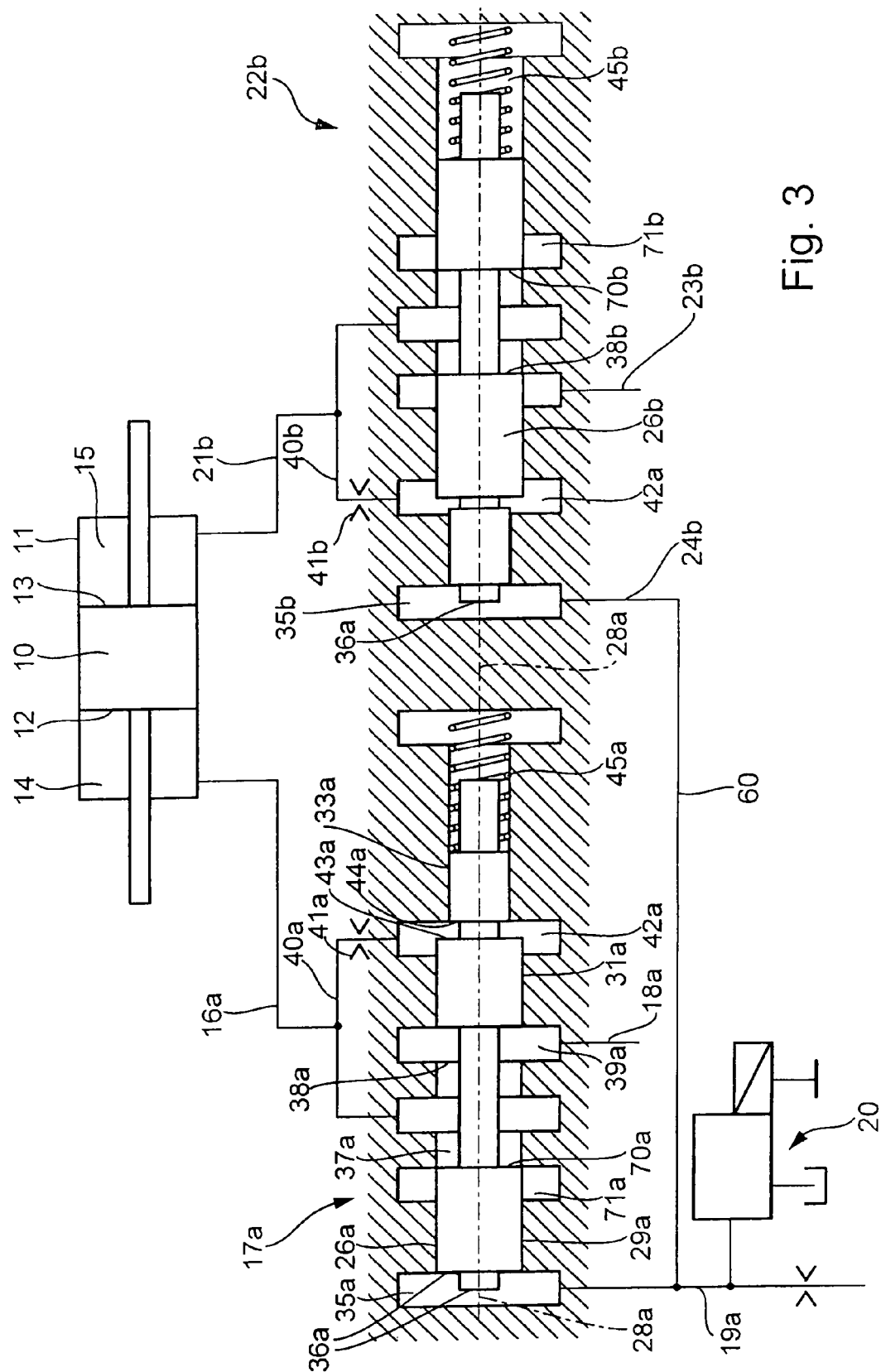
FIG. 3 shows a hydraulic fluid supply device of a transmission according to the invention in a second exemplary embodiment.

A second embodiment of the invention is illustrated in FIG. 3. With the configuration otherwise corresponding essentially to FIG. 1, the regulating slide valves 17a, 22b are desiged so as to be inverted with respect to one another. The same control pressure of a common solenoid regulating valve 20 is supplied to the regulating slide valves 17a, 22b. For this purpose, the control pressure line 19a is connected to the control pressure line 24a via a bypass line 60.

Figure 4:
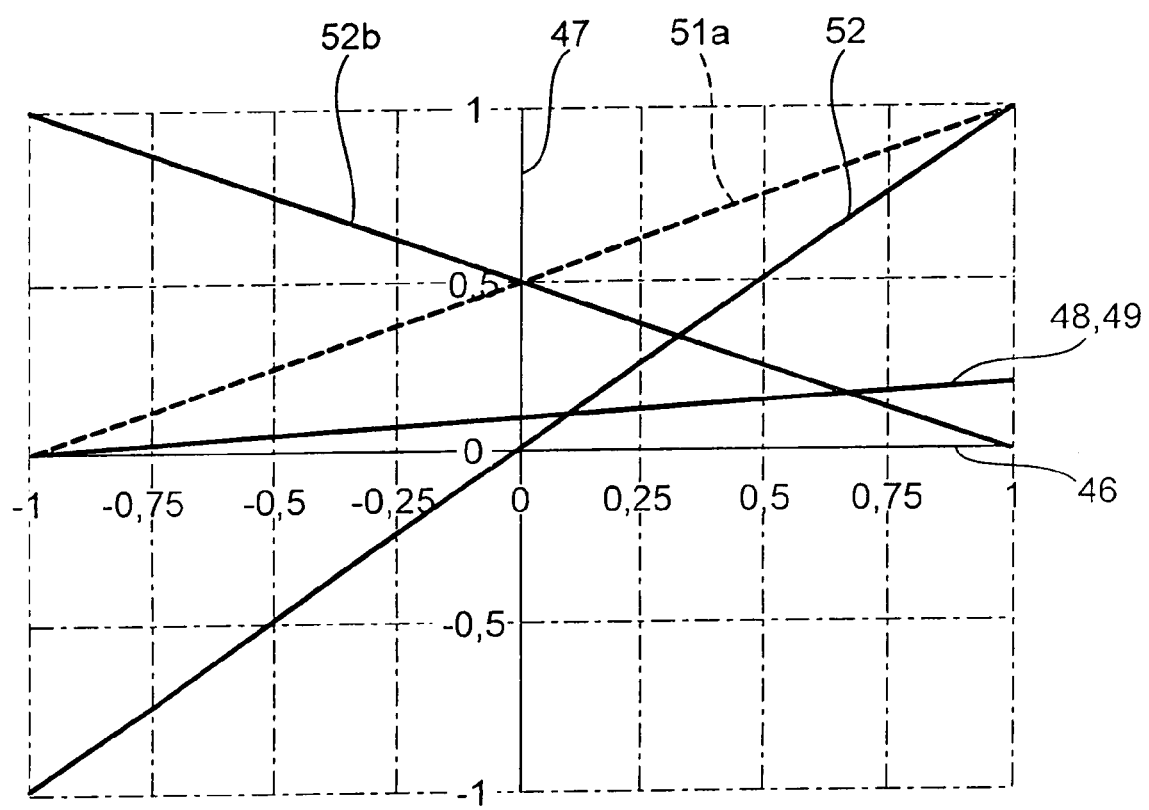
FIG. 4 shows pressure and regulating force dependences according to the second exemplary embodiment.

By virtue of a suitable configuration of the active end faces of the regulating slides 26a, b and of the arrangement of the control edges 38a, b and 70a, b the following regulating force/pressure dependence illustrated in FIG. 4 is obtained:

The control pressure 48, 49 of the common solenoid regulating valve 20 can be varied between zero and the maximum pressure by the suitable energization of the solenoid regulating valve 20, the control pressure amounting to zero for a negative regulating force of a maximum amount and being at a maximum for the maximum regulating force. This results, for the solenoid regulating valve 17a, in a proportional pressure profile of the regulating pressure 51a in the regulating pressure line 16a. For the inverse solenoid regulating valve 22b, for zero control pressure, a maximum regulating pressure 52b in the regulating pressure line 22b is obtained, which falls linearly with an increase in the control pressure 48, 49 and reaches zero for a maximum control pressure 48, 49. With a predetermined control pressure of 0 bar, the two regulating slides 17a, 22b are pressed to the left against a stop owing to the prevailing spring forces of the compression springs 45a, 45b. While the control edge 38 of the regulating slide valve 17a completely closes the overflow cross section from the annular duct 39a to the regulating pressure space 37a, the flow passage from the annular duct 39b to the regulating pressure space 37b is opened completely by the control edge 38b of the regulating slide valve 22b. When the control pressure of the solenoid regulating valve 20 rises, the two regulating slides 26a, 26b travel to the right. While the control edge 38a opens increasingly with an increase in control pressure, the control edge 39a closes increasingly with an increase in control pressure.

The maxima of the regulating pressures 51a, 52b are identical. For half the maximum control pressure 48, 49, the regulating pressures 51a, 52b are equal. In this case, the pressure forces acting on the piston 10 compensate one another, so that a regulating force of zero is obtained. For different operating ranges, the regulating force 52 has a constant and linear profile.

Any tolerance in the inverted regulating slide 22b, for example as a result of the spread of the spring characteristic, can be reduced by setting the prestress to a negligible value.

In this second embodiment of the invention, particular attention is given to the configuration of the bypass line 60, since the control pressures in the control pressure spaces 35a and 35b can influence one another via this common line. Here (as on other lines 19, 24, 16, 21, 40, too), absorption elements, such as throttles, diaphragms or piston accumulator elements, may be used.

Figure 5:
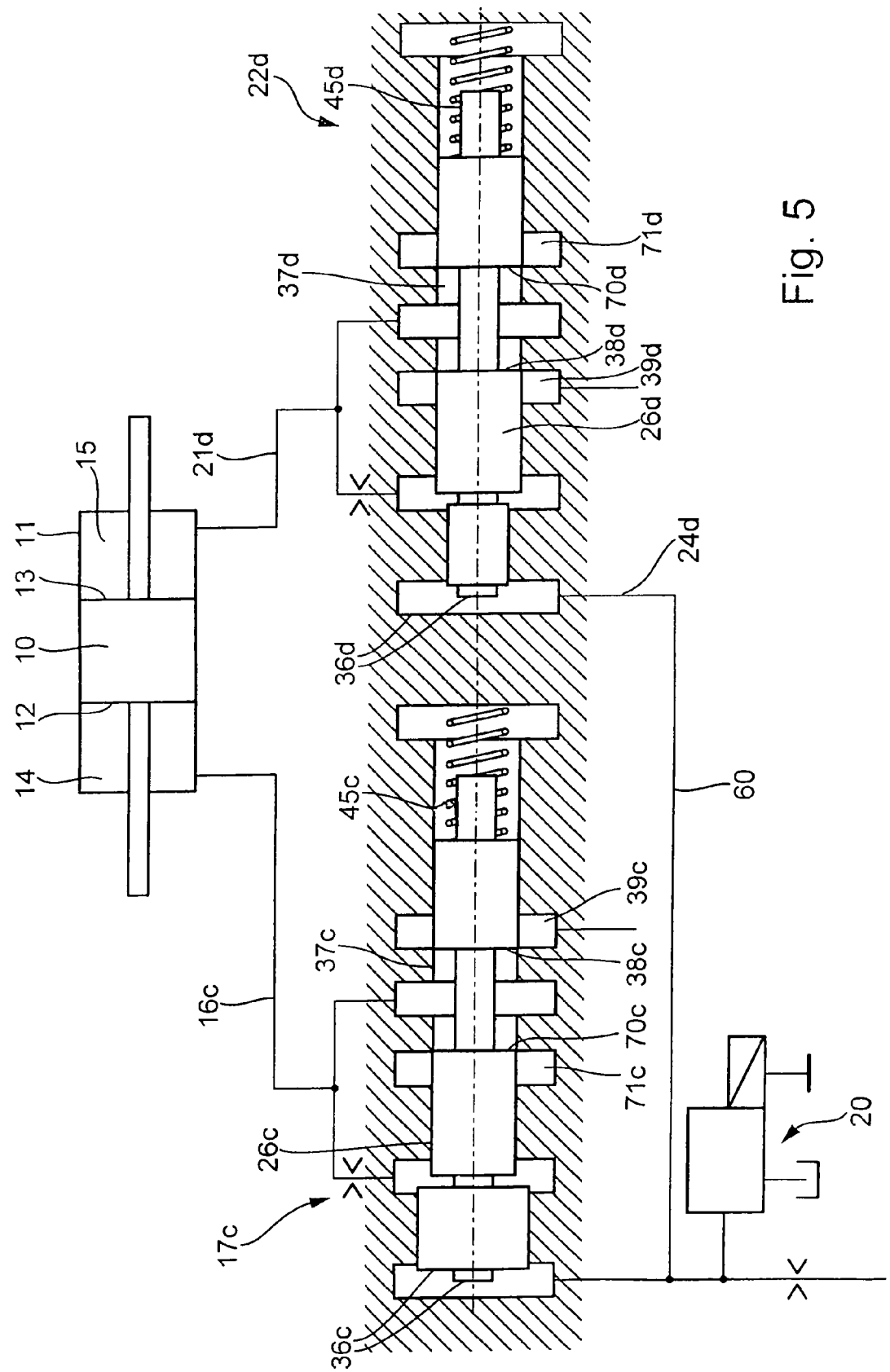
FIG. 5 shows a hydraulic fluid supply device of a transmission according to the invention according to a third exemplary embodiment.

A third embodiment of the invention is illustrated in FIG. 5. In order to lower the pressure requirement, particularly in the lower part load range, the regulating slides 17c, 22d of the second embodiment are designed for different pressure ranges of the control pressure of the solenoid regulating valve 20 responsible for both regulating slide valves 17c, 22d. In comparison with the second embodiment, therefore, the arrangement remains essentially unchanged, and only the spring rigidity of the compression springs 45c,d and the active end faces 36c,d of the regulating slides 26c,d may have to be suitably adapted:

For a disappearing control pressure in the control pressure line 19c, the regulating slide 26c bears against a left stop of the regulating slide valve 17c. A prestress of the spring 45c is selected such that, with a pressure rise of the control pressure in the control pressure line 19c, the regulating slide 26c bears further against the stop until half the maximum control pressure is reached. Only with an increase in the control pressure over half the maximum control pressure is the regulating slide 6c moved to the right, the control edge 38c increasingly opening the flow passage from the annular duct 39c to the regulating pressure space 37c during the movement of the regulating slide 26c.

For the inverted regulating slide valve 22d, when half the maximum control pressure is reached, the control edge 38d closes the flow passage from the annular duct 39d to the regulating pressure space 37d. Simultaneously, a further control edge 70d opens a flow passage from a pressureless annular groove 71d, which is connected, for example, to a tank, to the regulating pressure space 37d, so that the regulating pressure in the regulating pressure line 21d amounts to zero.

Figure 6:
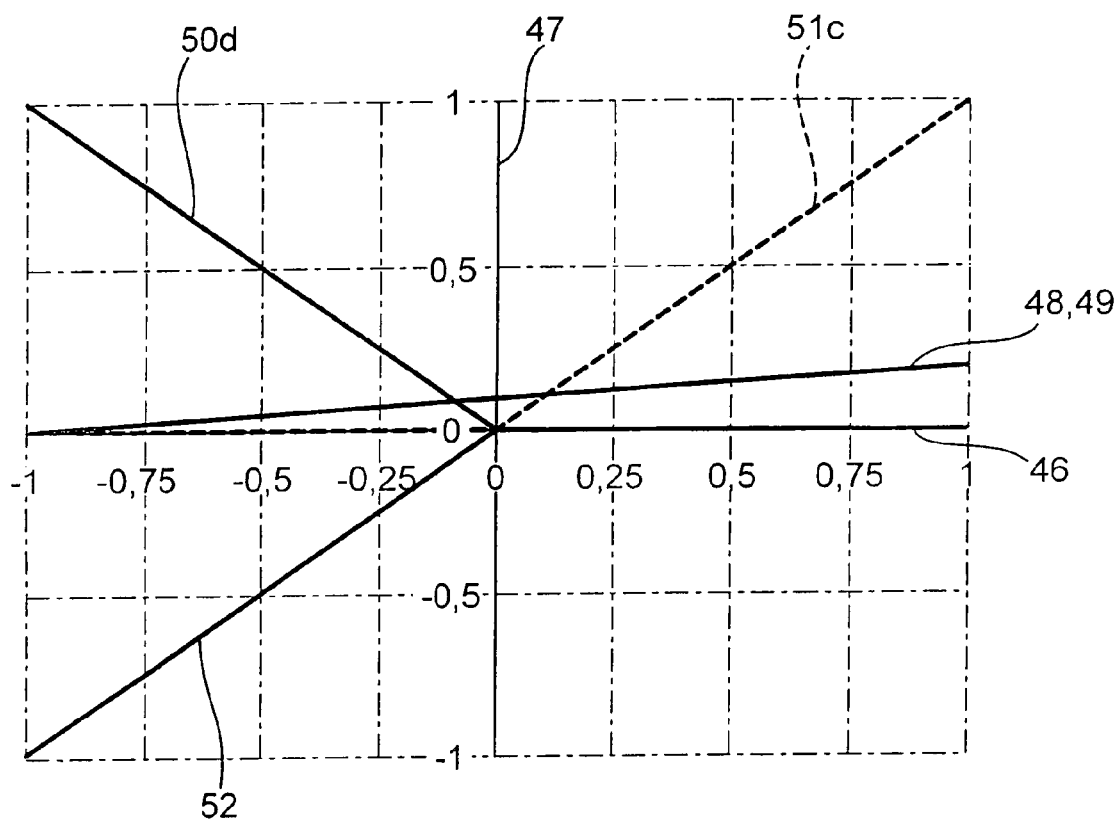
FIG. 6 shows pressure and regulating force dependences according to the third exemplary embodiment.

FIG. 6 shows a regulating force/pressure dependence according to FIG. 2 for the third exemplary embodiment. The control pressures 48, 49 rise from 0 for a maximum negative regulating force linearly with a rise in regulating force. As a result of the design of the cross sections and spring rigidities or spring prestresses, the regulating pressure profiles 50d, 51c and the resultant differential pressure 52 are formed according to the profiles illustrated in FIG. 2.

Figure 7:
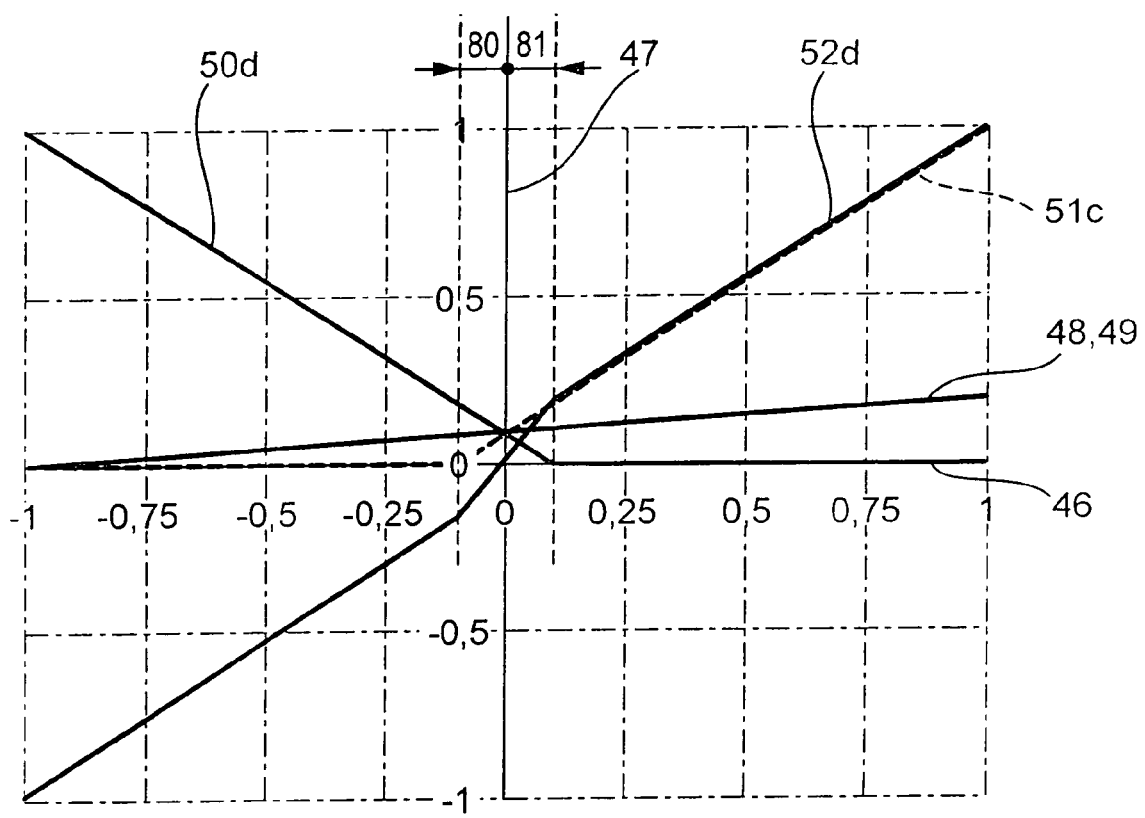
FIG. 7 shows pressure and regulating force dependences according to a fourth exemplary embodiment.

According to a fourth embodiment of the invention, the control edges 38c, 38d reach their closing position for different control pressures. The solenoid regulating valve 17c opens even in the case of a torque 80 (FIG. 7) which is lower than zero, while the regulating slide valve 22d closes only in the case of a torque 81 which is higher than zero. The torques 80, 81 are preferably equal in amount. As a result of the displacement of the closing points which was set out above, a regulating force characteristic 52d which is linear in portions is obtained. For standardized torques within a first operating range between the maximum negative torque and the torque 80, only the pressure 50d bears on the piston 10, while the pressure 51c amounts to zero. In a second operating range for torques in the range of the torque 80 and the torque 81, low pressures 50d and 51c bear on the piston 10. As a result of the superposition of the forces exerted on the two piston surfaces, the gradient of the regulating force characteristic 52d in the region of the torques 80 and 81 increases. For a third operating range with torques above the torque 81, the regulating pressure 50d amounts to zero, while the regulating pressure 51c rises linearly. On account of the steep characteristic in the region of the torques 80 and 81, that is to say in the region of the coordinate origin, and consequently, in particular, for a load change on the variable-speed gear, there is a steep regulating force characteristic 52d which makes it possible to have an improved regulating behavior.

Figure 8:
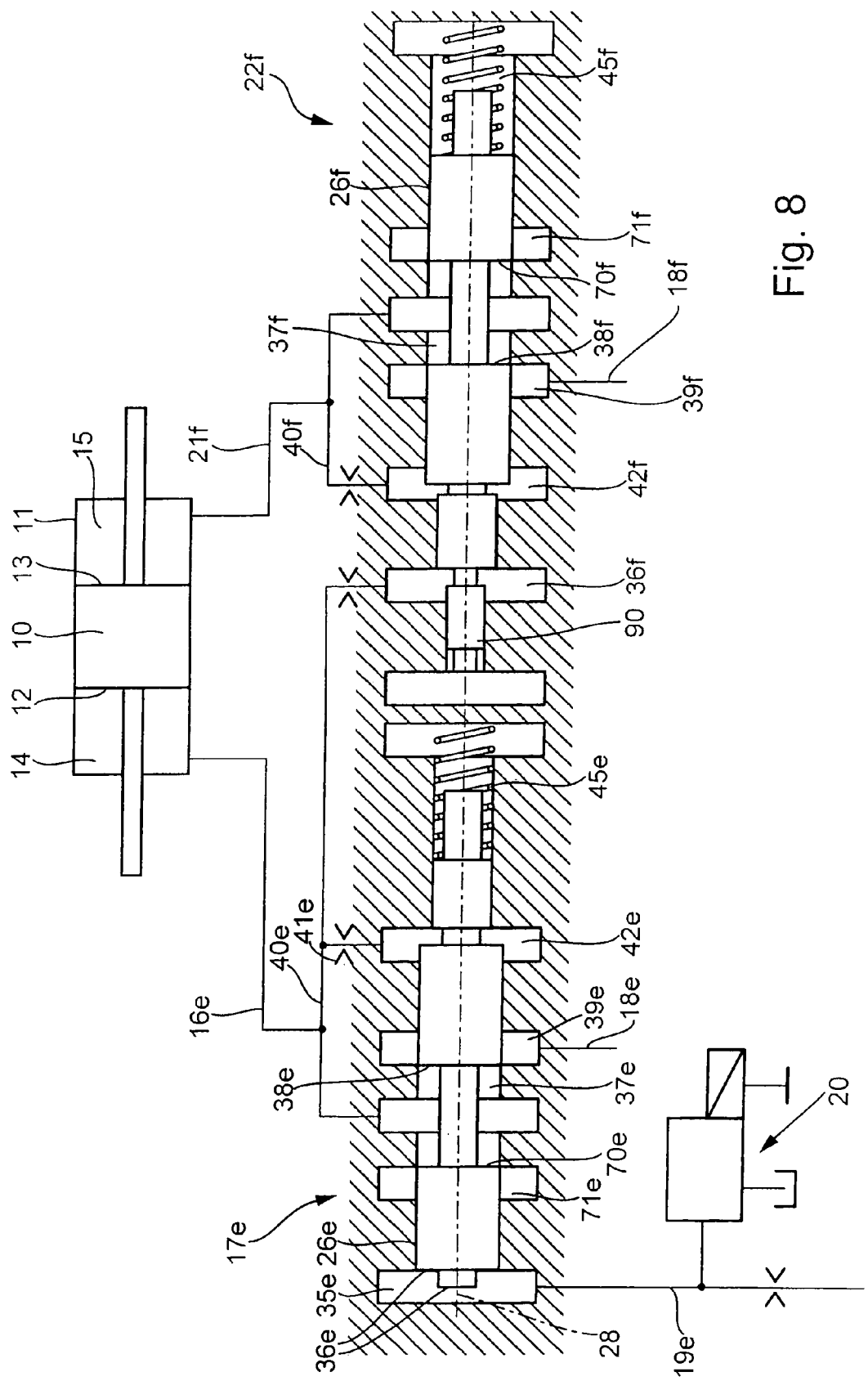
FIG. 8 shows a hydraulic fluid supply device of a transmission according to the invention in a fifth exemplary embodiment.

A fifth exemplary embodiment, illustrated in FIG. 8, corresponds essentially to the second to fourth exemplary embodiments. However, the control pressure of a control pressure line is not supplied to the regulating slide valve 22f. Instead, the regulating pressure of the regulating pressure line 16e or of the bypass line 40e is supplied as control pressure to the regulating slide valve 22f. Since the regulating pressure of the regulating pressure line 16e which is supplied to the regulating slide valve 22f is higher than the control pressure required, this does not act on an entire free end space of the regulating slide, but only on a part face. For this reason, the regulating slide 26f has an extension 90 for reducing the active end face.

Figure 9:
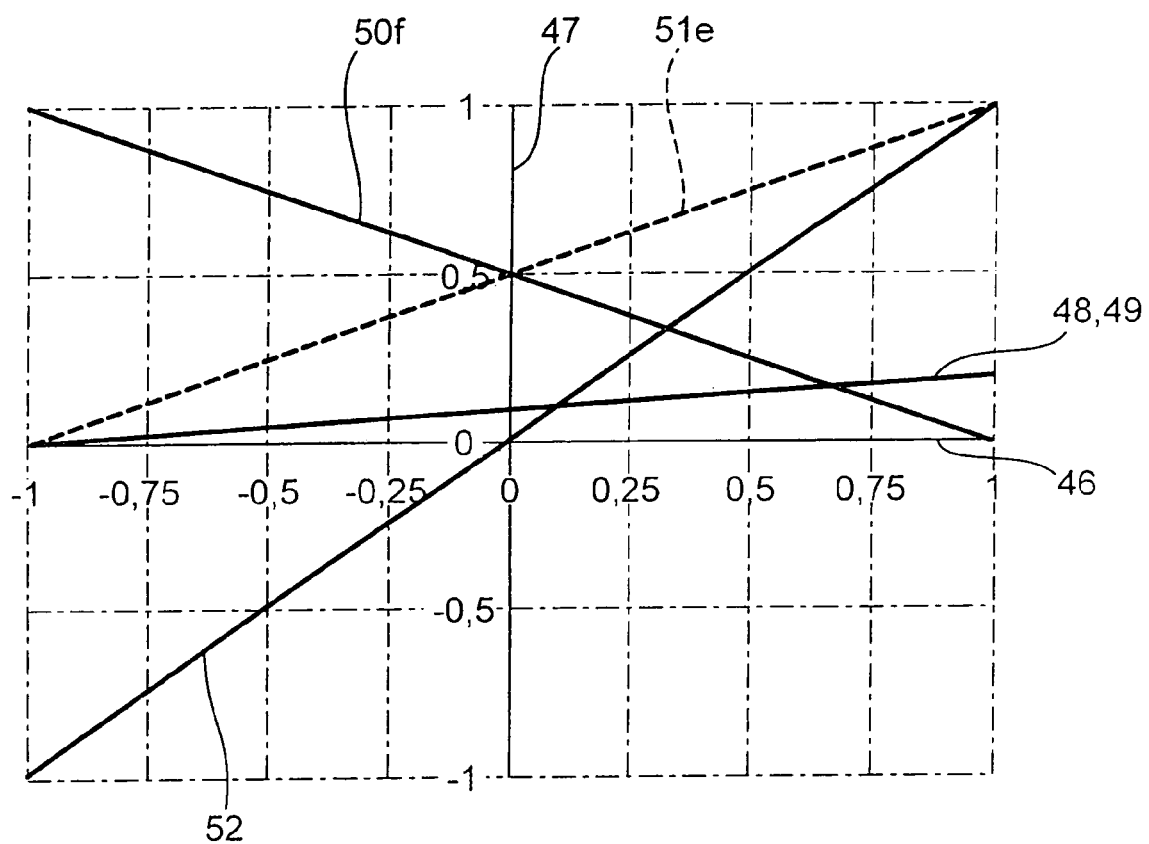
FIG. 9 shows pressure and regulating force dependences according to the fifth exemplary embodiment.

The pressure/regulating force dependence of the fifth exemplary embodiment in FIG. 9 corresponds essentially to the illustration according to FIG. 4. With a different configuration of the spring characteristics or spring prestress and of the active end faces, dependences according to FIG. 6 or FIG. 7 can also be achieved by means of the basic embodiment according to FIG. 8.

Figure 10:
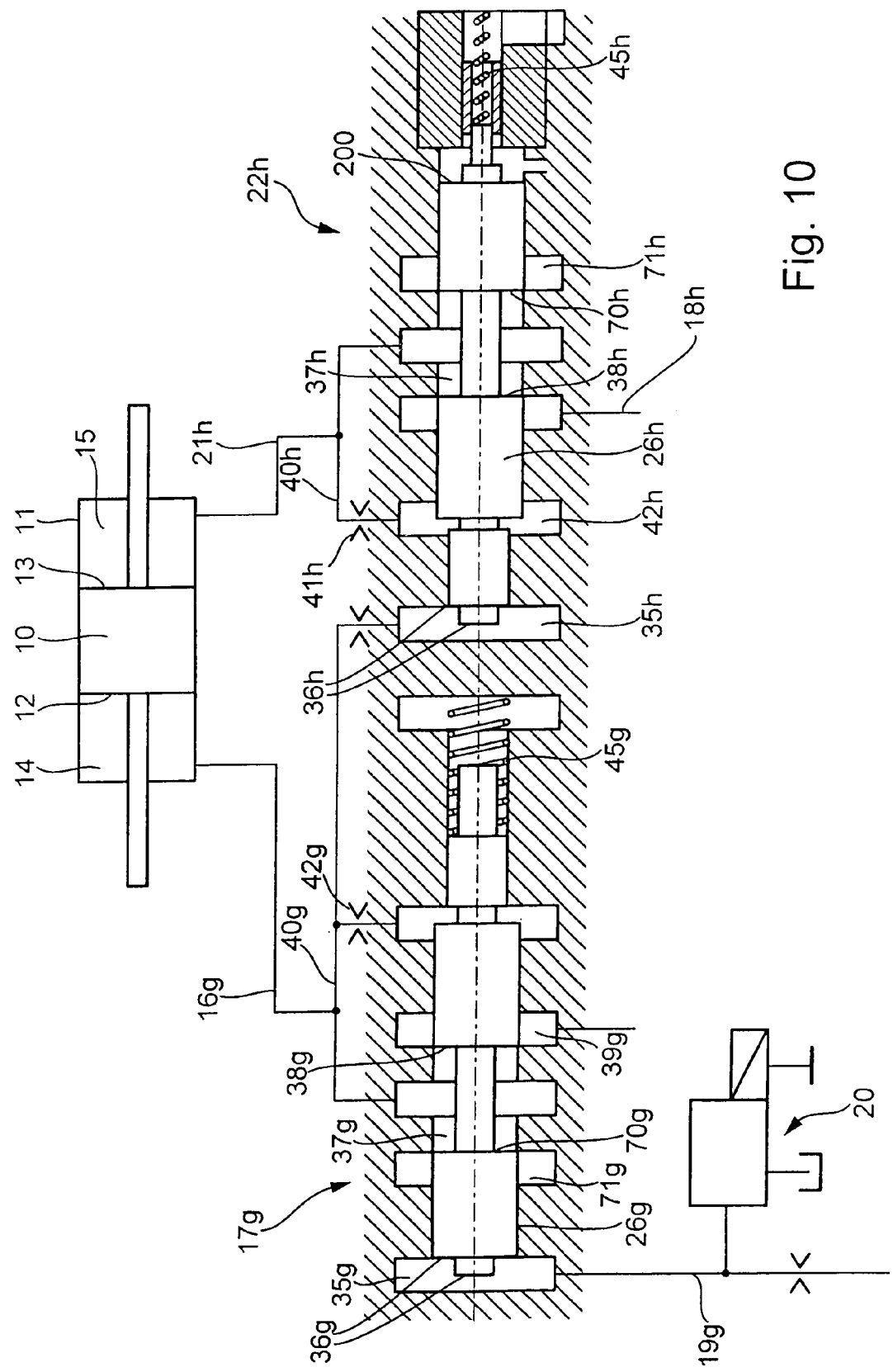
FIG. 10 shows a hydraulic fluid supply device of a transmission according to the invention in a sixth exemplary embodiment.

A sixth embodiment of the invention is illustrated in FIG. 10. In addition to a control pressure in a control pressure space 35h and to a bypass pressure in a bypass space 42h, in particular in addition to a spring 45h, a pressure acts on that end face 200 of the regulating slide 26h which is located opposite the control pressure space 35h. This pressure is, for example, the working pressure of the working pressure line 18h which acts, unreduced or reduced according to a further control edge of the regulating slide 26h, upon an end face 200 of the regulating slide 26h. Alternatively or additionally, it is also possible to act upon the end face 200 via a further solenoid regulating valve. By means of this sixth embodiment, the pressure requirement for the working pressure of approximately zero in the range of the torque can be lowered, cf., in this respect, the third embodiment according to FIG. 5.

In order to generate a pressure difference of zero and consequently a disappearing regulating force in the two pressure spaces 14, 15, the force on the regulating slide 26h, which is correlated with the sum of the force exerted by the control pressure and the bypass pressure on the regulating slide 26$h$, must be in equilibrium with that force which is derived from the compression spring 45$h$ and from the working pressure (or a part thereof) acting on the end face 200 of the regulating slide 26$h$.

When the working pressure is lowered to a lower level in the case of a low load and during idling, the control pressure, in particular in the control pressure line 19$g$, can also be reduced and therefore a high efficiency can be achieved.

Figure 11:
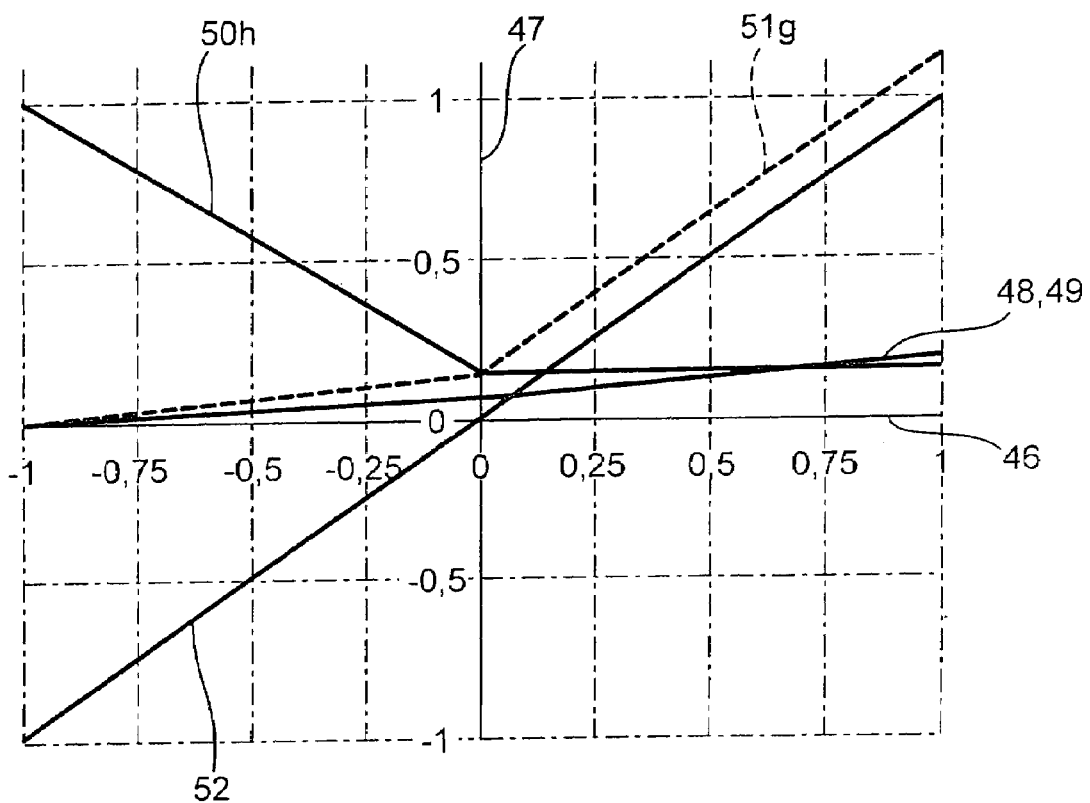
FIG. 11 shows pressure and regulating force dependences according to the sixth exemplary embodiment.

When the control pressure in the control pressure line 19$g$ is increased for a positive torque range, the control edge 38$g$ connects the annular duct 39$g$ to the regulating pressure chamber 37$g$ and thus ensures a pressure rise of the regulating pressure in the regulating pressure line 16$g$. This leads to a pressure rise in the control pressure space 35$h$ and consequently on the left end face of the regulating slide 26$h$, with the result that the regulating slide 26$h$ is induced to move to the right. This change in the force conditions can be compensated by means of the (working) pressure routed onto the right end face 200 and likewise rising as a result of suitable regulation or as a result of a further control edge. Consequently, the regulating pressure in the regulating pressure line 21$h$ and in the pressure space 15 remains at its constant pressure level, cf. FIG. 11.

It is likewise conceivable not to use a pressure profile proportional to the regulating pressure in the regulating pressure line 16$g$ for the working pressure acting on the right end face of the regulating slide 26$h$. This results in a correspondingly varied profile of the pressure in the regulating pressure line 21$h$ which can be taken into account by a control device for presetting the pressure in the regulating pressure line 16$g$ and consequently in the control pressure line 19$g$ by means of the solenoid regulating valve 20. For the negative torque range, according to FIG. 11, the control pressure in the control pressure line 19$g$ is lowered to a level which is lower than or equal to one quarter of the maximum control pressure in the control pressure line 19$g$. The regulating pressure in the regulating pressure line 16$g$ extends over a range proportional to this.

Starting from a disappearing control pressure in the control pressure line 16$g$, the pressure in the regulating pressure line 21$h$ is codetermined by means of the working pressure acting on the end face 200 of the regulating slide 26$h$. When the regulating pressure of the regulating pressure line 16$g$ rises, the regulating slide 22$h$ is varied in its position in such a way that the regulating pressure space 37$h$ is connected to the pressureless annular groove 71$h$ via the control edge 70$h$. The regulating pressure in the regulating pressure line drops. A new equilibrium of forces is established at the regulating slide 26$h$ when the force increase caused by the regulating pressure of the regulating pressure line 16$g$ which prevails in the control pressure space 25$h$ has been compensated by the pressure drop of the regulating pressure in the regulating pressure line 21$h$. It is thus possible, with the aid of the regulating pressure in the regulating pressure line 16$g$, to accurately set the regulating pressure in the regulating pressure line 21$h$ (and consequently the differential pressure or the regulating force).

Figure 12:
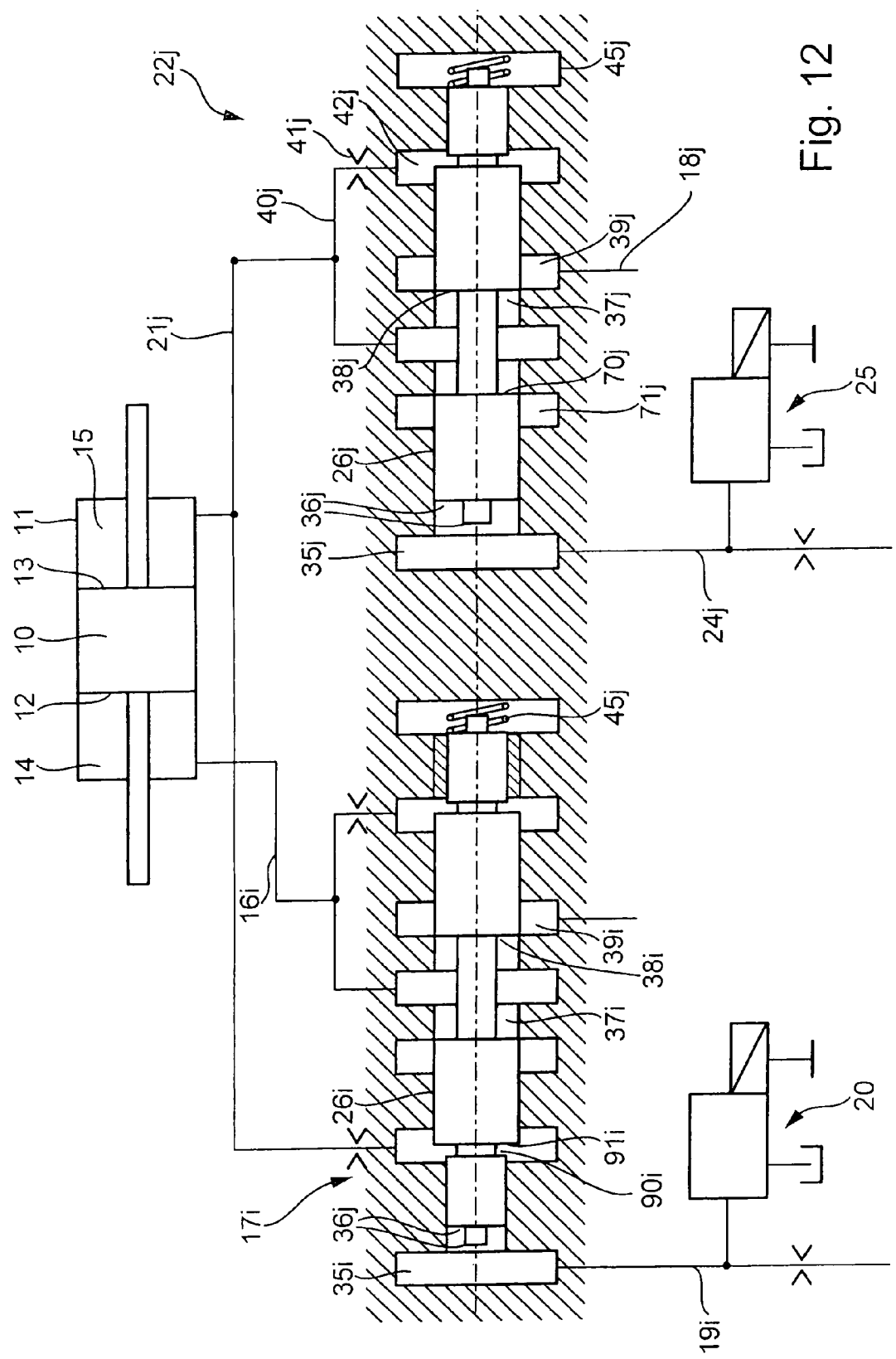
FIG. 12 shows a hydraulic fluid supply device of a transmission according to the invention in a seventh exemplary embodiment.

According to the seventh exemplary embodiment illustrated in FIG. 12, the regulating slide valve 22$j$ generates in the regulating pressure line 21$j$ a regulating pressure which is proportional to the control pressure provided in the control pressure line 24$j$ by a solenoid regulating valve 25. In addition to a feedback of the regulating pressure in the regulating pressure line 21$j$ according to the preceding exemplary embodiments, the regulating pressure of the regulating pressure line 21$j$ of the regulating slide valve 22$j$ is recirculated to the first regulating slide, if appropriate with a throttle or diaphragm being interposed. This regulating pressure acts on two opposite end faces 90$i$, 91$i$ which, according to the exemplary embodiment illustrated in FIG. 12, generate a resultant force to the right, that is to say in the opening direction of the regulating slide valve 17$i$. The regulating slide valve 22$j$ is designed essentially according to the regulating slide valve 17 illustrated in FIG. 1, so that the control pressure of the solenoid regulating valve 25 which prevails in the control pressure line 24$j$ is converted into a proportional regulating pressure in the regulating pressure line 21$j$.

Accordingly, by means of the regulating slide valves 17$i$, 22$j$, the piston is acted upon in the pressure space 15 by a pressure which is dependent solely on the control pressure in the control pressure line 24$j$, while the piston 10 is acted upon in the pressure space 14 by a pressure which is relative to the pressure in the pressure space 15. The functioning of the subsystems which extend beyond this and consist of the regulating slide valves 17$i$, 22$j$ is identical to the functioning of the corresponding systems of the first embodiment, cf. FIG. 1.

When a constant control pressure which is half the maximum control pressure prevails in the control pressure space 35$i$ and when the control pressure in the control pressure line 24$j$ is increased from 0 on, the regulating slide 22$j$ causes a rise of the pressure in the pressure space 15. As a result of the recirculation of the pressure in the pressure space 15 to an end face of the regulating slide 26$i$, the position of the regulating slide 26$i$ is varied, so that the control edge 38$i$ opens and provides an overflow cross section from the annular duct 39$i$ into the regulating pressure space 37$i$. The pressure in the pressure space 14 is set to the pressure in the pressure space 15. The pressure difference in the pressure spaces 14, 15 remains constant despite the increase in the pressures in the pressure spaces 14, 15.

Figure 13:
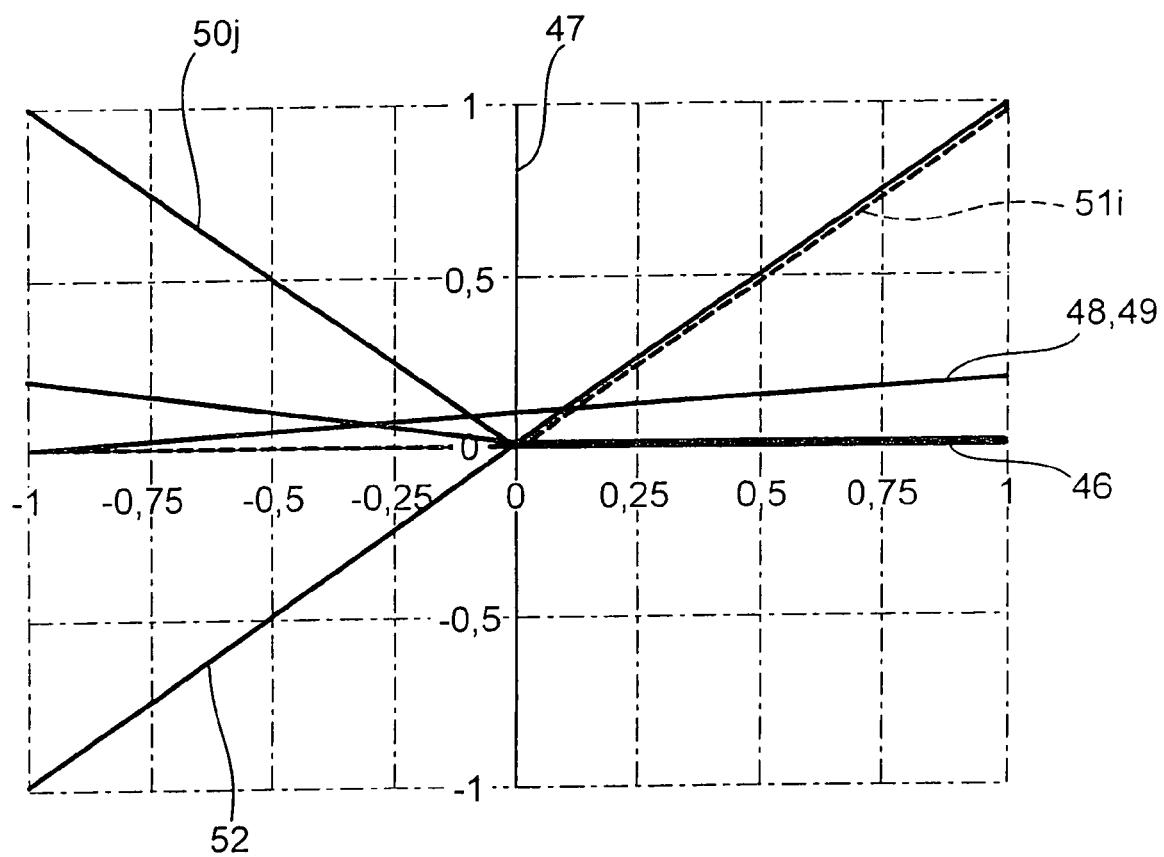
FIG. 13 shows pressure and regulating force dependences according to the seventh exemplary embodiment.

In order to achieve a variation of the pressure difference in the pressure spaces 14, 15, the control pressure in the control pressure line 19$i$ must be varied, cf. FIG. 13. By a raising of the control pressure of the control pressure line 19$i$, the equilibrium at the regulating slide 26$i$ is disturbed, so that the regulating slide 26$i$ opens the control edge 38$i$ between the working pressure and the regulating pressure in the regulating pressure chamber 37$i$, until the prevailing forces have been compensated. So that the desired pressure difference in the pressure chambers 14, 15 can be set at the piston, the following condition must be fulfilled:

The regulating pressure in the regulating pressure line 21$j$ which is set via the regulating slide valve 22$j$ must be lower than the difference between the working pressure in the working pressure line 18$j$ and the desired pressure difference which is correlated to the desired regulating force.

Otherwise, the pressure in the pressure space 14 reaches the level of the working pressure and cannot set the predetermined desired differential pressure.

In order to reverse the pressure difference at the piston 10, the control pressure in the control pressure line 19$i$ must lie in the range of 0 to half the maximum control pressure. The equilibrium of forces resulting from this at the regulating slide 17$i$ ensures a pressure difference in the pressure spaces 14, 15 which is proportional to the control pressure. The precondition for functioning with a reversed pressure difference is a pressure level of the regulating pressure in the regulating pressure line 21$j$ which lies above the predetermined differential pressure.

The solenoid regulating valve or valves 20 is or are acted upon via a control device by a suitable current which is correlated to the desired regulating force, the desired torque or the desired transmission ratio. These are predetermined according to a driver or a suitable automatic program.

What is claimed is:

1. A transmission with a roller transmitting a drive torque between a driving toroidal disk and a driven toroidal disk, with a
   transmission ratio between the driving toroidal disk and the driven toroidal disk being continuously variable according to a pivot position of the roller,
   the pivot position of the roller being controlled via a regulating force applied by at least one piston (10),
   the at least one piston (10) being acted upon by a pressure medium via two pressure spaces (14, 15),
   regulating slide valves (17, 22) for generating pressures in the pressure spaces (14, 15) according to a hydraulic control pressure supplied to the regulating slide valve (17,22),
   each pressure space (14, 15) being connected to a different regulating slide valve (17, 22), each regulating slide valve (17, 22) including a regulating slide (26) and at least one of the regulating slides (26) having exactly two control edges (38, 70), the regulating slides (26) of the different regulating slide valves (17, 22) being acted upon by different control pressures).

2. The transmission as claimed in claim 1, wherein depending on the load situation, the regulating pressure for one of the two pressure chambers (14, 15) is constant at a low pressure.

3. The transmission as claimed in claim 1, wherein one regulating slide valve (22b; 22d) is designed so as to be functionally inverted with respect to the other regulating slide valve (17a; 17c).

4. The transmission as claimed in claim 3, wherein the two regulating slide valves (17a, 22b; 17c, 22d) are connected to one another via a common control line (19a, 60, 24b).

5. The transmission as claimed in claim 4, wherein throttle elements are arranged in the common control line (60) in order to avoid reactions of one regulating slide valve (17a, 17c or 22b, 22d) on the other regulating slide valve (22b, 22d or 17a, 17c).

6. The transmission as claimed in claim 1, wherein the two regulating slide valves (17c, 22d) are designed for different pressure ranges of the control pressure.

7. The transmission as claimed in claim 1, wherein the regulating slides (26e, 26f) of the regulating slide valves (17e, 22f) are supported in each case via springs (45e,f) with respect to the housings of the regulating slide valves (17e, 22f).

8. The transmission as claimed in claim 7, wherein the spring, the end faces of the regulating slides and the relative position of the control edges are designed in such a way that, in a defined working range, the regulating slide valves in each case generate a regulating pressure rising linearly from zero, the working ranges of the regulating slide valves overlapping one another.

9. The transmission as claimed in claim 7, wherein the springs, the end faces of the regulating slides and the relative position of the control edges are arranged in such a way that, in a defined working range, the regulating slide valves in each case generate a regulating pressure rising linearly from zero, the working ranges of the regulating slide valves being contiguous to one another without overlapping one another.

10. The transmission as claimed in claim 1, wherein a control pressure is supplied to a first regulating slide valve (17g) and the regulating pressure of the first regulating slide valve (17g) is supplied as control pressure to the second regulating slide valve (22h).

11. The transmission as claimed in claim 10, wherein at least one regulating slide (26h) of a regulating slide valve (22h) is displaceable with respect to a pressure space by means of a variable supporting pressure provided by a solenoid regulating valve.

12. The transmission as claimed in claim 11, wherein, with low loads and during idling, the supporting pressure is lowered to a low level.

13. The transmission as claimed in claim 1, wherein the control pressure of at least one regulating slide is provided by a solenoid regulating valve.

14. The transmission as claimed in claim 13, wherein the control pressure of both regulating slide valves is provided by a common solenoid regulating valve (20).

15. A transmission including:
    a roller transmitting a drive torque between a driving toroidal disk and a driven toroidal disk,
    transmission ratio between the driving toroidal disk and the driven toroidal disk being continuously variable according to a pivot position of the roller,
    the pivot position of the roller being variable by an operating device having a piston being acted upon on opposite sides via two pressure spaces in order to vary its position,
    the action upon the pressure spaces being controlled by a regulating slide valve arrangement which, according to a control pressure of the operating fluid supplied to the regulating slide valve generates a regulating pressure supplied to at least one pressure space, the regulating slide valve arrangement including a first regulating slide valve to which a regulating pressure is supplied via one of the pressure spaces and a regulating pressure of a second regulating slide valve is supplied to the other pressure space, the second regulating slide valve being acted upon by a control pressure and by the regulating pressure of the first regulating slide valve,
    the control pressure acting permanently on one end face of a regulating slide,
    an opposite end face of the regulating slide being supported with respect to a slide valve housing via a spring element in a supporting chamber,
    the regulating slide having a control edge for controlling a flow passage for applying the working pressure to a regulating pressure connection which is in communication with different annular end faces of the regulating slide valve, the slide valve having a
    regulating slide with a control edge for opening, according to the control pressure, a flow passage for connecting a pressure-less, annular groove hydraulically to the regulating pressure space for discharging hydraulic fluid therefrom.

16. The transmission as claimed in claim 15, wherein the control pressures of the first and the second regulating slide valve are provided via solenoid regulating valves.

17. A transmission with a roller transmitting a drive torque between a driving toroidal disk and a driven toroidal disk, with a
    transmission ratio between the driving toroidal disk and the driven toroidal disk being continuously variable according to a pivot position of the roller,
    the pivot position of the roller being controlled via a regulating force applied by at least one piston (10),
    the at least one piston (10) being acted upon by a pressure medium via two pressure spaces (14, 15), regulating slide valves (17, 22) for generating pressures in the pressure spaces (14, 15) according to a hydraulic control pressure supplied to the regulating slide valve (17,22), each pressure space (14, 15) being connected to a separate regulating slide valve (17, 22), one of said regulating slide valves being acted upon by a control pressure and a working pressure, the control pressure acting permanently on one end face of a regulating slide of the regulating slide valve, an opposite end face of the regulating slide being supported with respect to a slide valve housing via a spring element in a supporting chamber, the regulating slide having a control edge for controlling opening, according to the control pressure, a flow passage for applying the working pressure to a regulating pressure connection which is in communication with different annular end faces of the regulating slide valve, the slide valve having a regulating slide with a control edge for opening, according to the control pressure, a flow passage for connecting a pressureless annular groove hydraulically to the regulating pressure space for discharging hydraulic fluid therefrom.

\* \* \* \* \*